United States Patent [19]

Umemori et al.

[11] Patent Number: 5,042,138

[45] Date of Patent: Aug. 27, 1991

[54] METHOD AND APPARATUS FOR MANUFACTURING A CORRUGATED PIPE

[75] Inventors: Noboru Umemori; Osamu Kouda, both of Hiratsuka; Yukio Horii, Nagahama, all of Japan

[73] Assignee: Mitsubishi Plastics Industries, Ltd., Tokyo, Japan

[21] Appl. No.: 557,648

[22] Filed: Jul. 25, 1990

Related U.S. Application Data

[62] Division of Ser. No. 362,660, Jun. 7, 1989, Pat. No. 4,976,289.

[30] Foreign Application Priority Data

Jul. 5, 1988 [JP] Japan .................. 63-167534

[51] Int. Cl.[5] .................. B21B 17/14; B21B 17/94
[52] U.S. Cl. .................. 29/527.4; 29/33 D; 29/890.053; 138/144; 138/154
[58] Field of Search ......... 29/33 D, 890.053, 890.043, 29/890.054, 527.4; 138/144, 154

[56] References Cited

U.S. PATENT DOCUMENTS

| | | | |
|---|---|---|---|
| 414,643 | 11/1889 | Hill .................. | 29/890.053 X |
| 2,595,747 | 5/1952 | Andersen . | |
| 4,029,129 | 6/1977 | Harper .................. | 138/154 X |
| 4,160,312 | 7/1979 | Nyssen .................. | 138/150 X |
| 4,197,728 | 4/1980 | McGowen . | |
| 4,301,200 | 11/1981 | Langenfield et al. .......... | 138/154 X |
| 4,350,547 | 9/1982 | Kanao .................. | 138/144 X |
| 4,800,928 | 1/1989 | Kanao .................. | 138/144 X |
| 4,838,317 | 6/1989 | Andre et al. .................. | 138/134 X |
| 4,860,797 | 8/1989 | Richards et al. .................. | 138/174 X |
| 4,862,924 | 9/1989 | Kanao .................. | 138/173 X |

FOREIGN PATENT DOCUMENTS

| | | |
|---|---|---|
| 1450369 | 11/1968 | Fed. Rep. of Germany . |
| 1038160 | 9/1953 | France . |
| 59-150733 | 8/1984 | Japan . |
| 62-141387 | 6/1987 | Japan . |

Primary Examiner—Carl J. Arbes
Attorney, Agent, or Firm—Oblon, Spivak, McClelland, Maier & Neustadt

[57] ABSTRACT

A flat strip-like metallic material having both surfaces coated with a first synthetic resin layer is passed between plural pairs of upper and lower rollers so that a U-shaped recess is formed at the central portion in the longitudinal direction of the strip material and ring-like projection at both edges of the strip material. Then, the strip material is bent into a spiral form. The spirally wound strip material is passed to a transferring means and first, second and third extruders to extrude molten resin and first, second and third pressing rollers operating in association with the respective extruders, whereby a second synthetic resin layer is formed at the outer circumferential portion of the adjoining edges of the spirally wound strip material, a third synthetic resin layer is formed on the back side of the recess portion of the same, and a fourth synthetic resin layer is formed on the outer circumferential surface of the recess portion and the adjoining edges of the spirally wound strip material.

2 Claims, 5 Drawing Sheets

METHOD AND APPARATUS FOR MANUFACTURING A CORRUGATED PIPE

This is a division of application Ser. No. 07/362,660, filed on June 7, 1989, now U.S. Pat. No. 4,976,289 issued Dec. 12, 1990.

BACKGROUND OF THE INVENTION

The present invention relates to a corrugated pipe, a method of forming the corrugated pipe and an apparatus for manufacturing the same, which is used for arranging therein cables such as power lines, communication lines and so forth.

As a method of forming the corrugated pipe of this type, there has been proposed such method as disclosed in, for instance, Japanese Unexamined Patent Publication No. 141387/1987 in which the central portion of a strip-like metallic material having both surfaces coated with a synthetic resin layer is bent along its axial direction to thereby form a substantially U-shaped recess in cross section and the strip material is bent in a spiral form followed by connecting the adjoining edges of the spirally wound strip material to thereby form a corrugated pipe. In the above-mentioned method, however, it was difficult to obtain a strong connection between the adjoining edges of the spirally wound strip material since the adjoining edges were merely joined by making both edges contact to each other or by overlapping the edges one on another followed by melting the synthetic resin layer covering the front and rear surfaces of the strip-like metallic material. Accordingly, when a force is applied to the corrugated pipe in its axial direction or a bending force is applied to the corrugated pipe, it is easily broken at a joined portion.

In the above-mentioned publication, there is also proposed such a method that the opposing edges of the spirally wound strip material are bent in a form of hook so that they are usually engaged. However, the operation for engaging the hooked edges is troublesome, and the process for forming the hooked edges is complicated.

On the other hand, in the case that the strip-like metallic material having both surfaces coated with a synthetic resin layer is bent in a spiral form, if the synthetic resin layer is made thick, the synthetic resin layer is apt to peel off from the surface of the strip-like metallic material or it is difficult to bend the strip material. Accordingly, it has been necessary that the synthetic resin layer coating the corrugated pipe obtained by a conventional method is made thin, which has poor corrosion resistance property. Accordingly, the outer surface of the corrugated pipe is easily corroded by underground water when the corrugated pipe is arranged in the ground.

SUMMARY OF THE INVENTION

It is an object of the present invention to provide a corrugated pipe, a method and apparatus for forming the corrugated pipe which is excellent in corrosion resistance property and flexibility, and has durability to a tensile strength in the axial direction of the pipe and to a bending force.

In accordance with the first invention, there is provided a corrugated pipe made of a flat strip-like metallic material wound in a spiral form characterized in that said strip material is covered in its entirety with a first synthetic resin layer and has a substantially U-shaped recess in cross section at the central portion in the longitudinal direction of the strip material and both edges constituting ring-like projections wherein a second synthetic resin layer is formed at the outer periphery of the joining portion of the adjoining edges having the ring-like protection of the spirally wound strip material; a third synthetic resin layer formed at the back side of the recess portion and a fourth synthetic resin layer covering the front side of the recess portion.

In accordance with the second invention, there is provided a method of forming a corrugated pipe by winding in a spiral form a flat strip-like metallic material having both surfaces covered with a synthetic resin layer, characterized by comprising:

a step of passing the strip-like metallic material between plural pairs of upper and lower rollers to form a substantially U-shaped recess portion in cross section at the central portion in the longitudinal direction of the strip material and ring-like projections at both edges of the strip material, and by passing the strip material into a pair of control rollers, a first bending roller and second bending roller successively to thereby form a spirally wound strip material having a predetermined curvature in which the recess faces outside;

a step of forwarding and rolling the spirally wound strip material by means of a transferring means during which a molten resin is extruded from a first extruder to the back side of the recess portion of the strip material and at the same time, the surface of the molten resin on the back side of the recess portion is pressed by a pressing roller to thereby form a synthetic resin layer having a predetermined thickness, and a step of making the adjoining edges of the spirally wound strip material contact; coating the outer circumferential surface of the adjoining edges in mutually contact with a molten resin extruded from a second extruder; pressing the surface of the molten resin by a pressing roller; coating the outer surface of the recess portion and the outer circumferential portion of the adjoining edges, on which the resin layer has been formed by the second extruder, with a molten resin by a third extruder; and pressing the surface of the molten resin by a pressing roller In accordance with the third invention, there is provided an apparatus for manufacturing a corrugated pipe which comprises a bending machine for bending a flat strip-like metallic material having both surfaces covered with a synthetic resin layer in a spiral form, a transferring means for forwarding and rolling the spirally wound strip material, first, second and third extruders for supplying a molten resin, and first, second and third pressing rollers for pressing the molten resin extruded from each of the extruders, wherein the bending machine has plural pairs of upper and lower rollers adapted to bend the strip material passing therethrough so that a substantially U-shaped recess portion in cross section is formed at the central portion in the longitudinal direction of the strip material and ring-like projections are formed at both edges of the strip material, a pair of upper and lower control rollers, and a first bending roller and a second bending roller in a combination which support the strip material and bends it in a spiral form in which the recess portion faces outside; the first extruder is to extrude and apply a molten resin to the back side of the recess portion of the spirally wound strip material; the first pressing roller is to press the surface of the molten resin to stick it onto the back side of the recess; the transferring means is to make the adjoining edges of the spirally wound strip material contact with each other while the strip material is moved forwardly; the second extruder is to extrude a molten resin on the outer circumferential surface of the adjoining edges of the spirally wound strip material; the second pressing roller is to press the surface of the molten resin; the third extruder is to extrude a molten resin on the outer surface of the recess portion and the outer circumferential portion of the adjoining edges of the spirally wound strip material; and the third pressing roller is to press the surface of the molten resin on the recess and the adjoining edges.

DETAILED DESCRIPTION OF THE PREFERRED EMBODIMENTS

Several embodiments of the present invention will be described with reference to the drawings.

Figure 1:
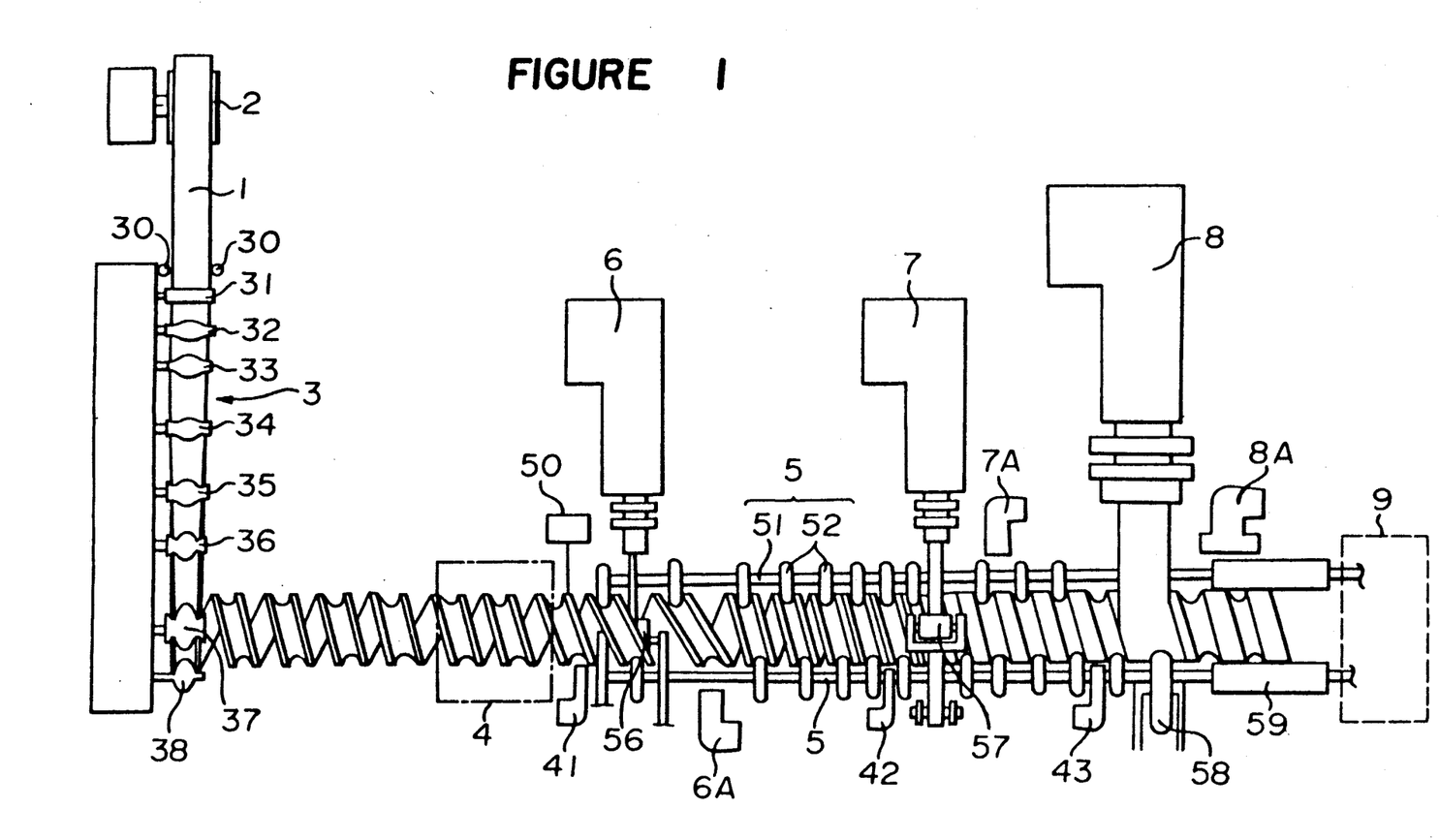
FIG. 1 is a diagram showing an embodiment of the corrugated pipe manufacturing apparatus according to the present invention.

In FIG. 1, a reference numeral 1 designates a flat strip-like metallic material comprising an elongated metallic plate 10 such as steel, stainless steel and so on and a synthetic resin layer 11 of polyethylene, vinylchloride and so on coated on the front and rear surfaces of the metallic material. The thickness of the synthetic resin layer 11 and the metallic plate 10 can be selected depending on the diameter of a corrugated pipe P obtained from the material and conditions of use. For instance, when a corrugated pipe having an outer diameter of 150 mm–200 mm is to be prepared, a strip material comprising an elongated metallic plate having a width of 80 mm and a thickness of 0.2 mm–1 mm and a synthetic resin layer 11 having a thickness of 0.1 mm–0.5 mm may be used.

In the present invention, first, the strip material 1 is rewound from the rewinding roller 2 and is supplied to the rolling machine 3 while both edges of the strip material 1 are controlled by a pair of rollers 30. The rolling machine 3 is composed of plural pairs of upper and lower rollers 31–36. When the strip material 1 is passed between the paired rollers 31–36, the flat strip-like material 1 is gradually bent, whereby a substantially U-shaped recess portion 12 in cross section is formed at the central portion in the longitudinal direction of the strip material 1 and at the same time, the both edges of it are bent into a circular form, so that ring-like projections 13 are formed.

Figure 2A:
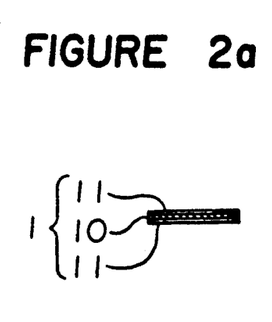
FIGS. 2a to 2e and FIG. 3 are diagrams showing an example of bending a flat strip-like metallic material in a spiral form.
Figure 2B:
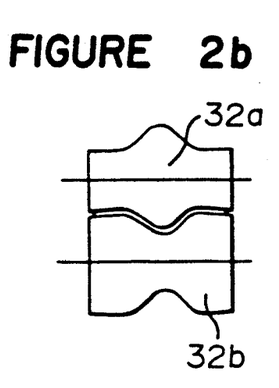
Figure 2C:
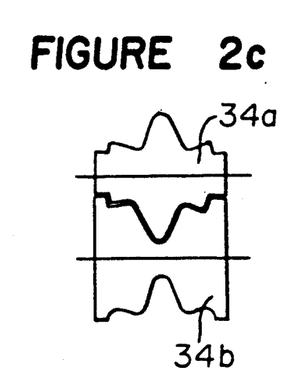
Figure 2D:
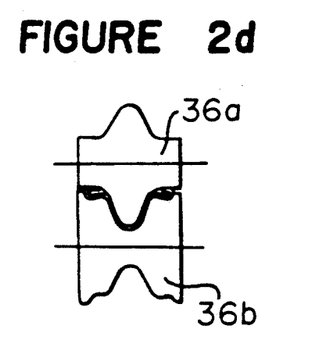
Figure 2E:
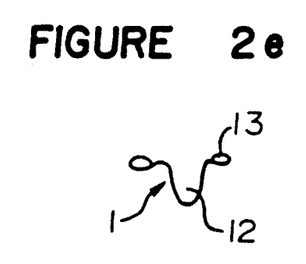

FIGS. 2a to 2e show a series of steps of bending operations. The strip material 1 is flat as shown in FIG. 2a before it is passed between the paired flat rollers 31. On the other hand, in each pairs of the rollers at the downstream side of the flat rollers 31, the upper rollers have curved surfaces in a raised form and the lower rollers have curved surface in a recessed form. The change of the curved surfaces of a series of the upper and lower rollers gradually increases toward the moving direction of the strip material 1. Accordingly, when the strip material 1 is passed between the paired upper and lower rollers 32a, 32b, 34a, 34b and 36a, 36b, it is gradually bent as shown in FIGS. 2i b–2d, and finally the substantially U-shaped recess portion 12 in cross section is formed at the central portion in the longitudinal direction of the strip material, and at the same time the ring-like projections 13 are formed at the both edges thereof as shown in FIG. 2e. The projections 13 are not always necessary to be in an entirely closed ring-shape, but there may be in a semi-circular ring-like form having an opening.

Figure 3:
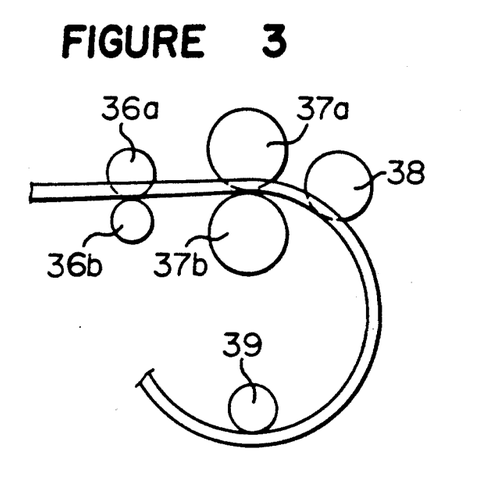

Then, the strip material 1 is passed between a pair of upper and lower control rollers 37a, 37b and is subsequently passed between a first bending roller 38 and a second bending roller 39 at which the strip material is bent to have a predetermined curvature, whereby the strip material is formed in a spiral form in which the recess portion 12 faces outside. In this case, the curvature of the strip material 1 can be determined by adjusting positions of the first and second bending rollers 38, 39. In the above-mentioned shaping steps, the rollers 31–39 are rotated at a constant speed by a driving motor (not shown). The spirally wound strip material 1 is held by a horizontally arranged transferring means 5 and a plurality of transferring rollers (not shown) arranged below the transferring means 5 so that the spirally wound strip material is moved forwardly. The transferring means 5 is composed of a pair of horizontally arranged assemblies each comprising a shaft 51 and a plurality of guide rollers 52 attached to the shaft at predetermined intervals, the shaft being rotated at a constant speed by a driving motor (not shown), whereby the spirally wound strip material 1 is moved forwardly while being subjected to a rolling movement by the guide rollers 52 fitted to the recess portion of the spirally wound strip material 1. The distance of the guide rollers 52 can be changed to meet the change in the distance of the recess portions of the spirally wound strip material 1.

There are provided the heating device 4, the first extruder 6, the second extruder 7, the third extruder 8 and the receiving section 9 in this order along the transferring direction of the strip material 1.

In a resin coating line, the spirally wound strip material is put in the heating device 4 in which the entirety of the strip material is heated. The heating device 4 may comprise an electric heater, the gas burner or any other suitable means as far as the spirally wound strip material is heated at a temperature of 50° C.–80° C.

When the spirally wound strip material comes out from the heating device 4, hot air is blown to the outer periphery of the recess portion 12 of the strip material 1 by means of a hot air blower 41 to heat it locally at a temperature of 90° C.–130° C. Then, molten resin is extruded to the back side of the recess of the spirally wound strip material, i.e. the inner circumferential portion projecting inwardly in the spirally wound strip material, from the first extruder 6 so that the molten resin is put onto the back side of the recess portion 12, and the surface of the molten resin is pressed by the first pressing roller 56. The outer circumferential surface of the pressing roller 56 have substantially the same curved surface in a concave form as the inner circumferential surface of the recess portion 12. Accordingly, the molten resin pressed by the first pressing roller 56 is firmly attached to the back side of the recess portion 12, whereby a synthetic resin layer 14 having a predetermined thickness is formed in a continuous manner.

In the resin coating step, it can be easy to put the molten resin extruded from the first extruder 6 to the back side of the recess portion 12 through the spaces in the spirally wound strip material because the distances of the guide rollers 52 of the transferring means 5 are so determined as to allow the molten resin to put through the spaces.

Then, cool air is blown to the outer circumferential surface of the spirally wound strip material 1 from a cool air blower 6A to cool the strip material at about 70° C. to thereby cure the synthetic resin layer 14 to some extent. On the other hand, the adjoining edges of the spirally wound strip material 1, which is supported by the transferring means 5 to be moved forwardly, are brought to be in contact with each other. The contact of the adjoining edges of the spirally wound strip material 1 is performed by arranging the guide rollers 52 which are so arranged that the distances of the guide rollers are made gradually small. Thus, a pipe body having a corrugated outer circumferential surface is obtainable. In the next step, hot air is blown to the outer circumferential surface of the adjoining edge portions of the pipe body from a hot air blower 42 to heat it at about 90° C. Then, molten resin extruded through the second extruder 7 is put on the outer circumferential portion of the adjoining edges, followed by pressing the surface of the molten resin by means of the second pressing roller 57. Thereafter, cool air is blown to the outer circumferential surface of the pipe body by means of a cool air blower 7A to cool the molten resin at a temperature of 50° C.-65° C., whereby the adjoining edges of the spirally wound strip material 1 is firmly connected by means of a synthetic resin layer 15 obtained by curing the molten resin.

Figure 4:
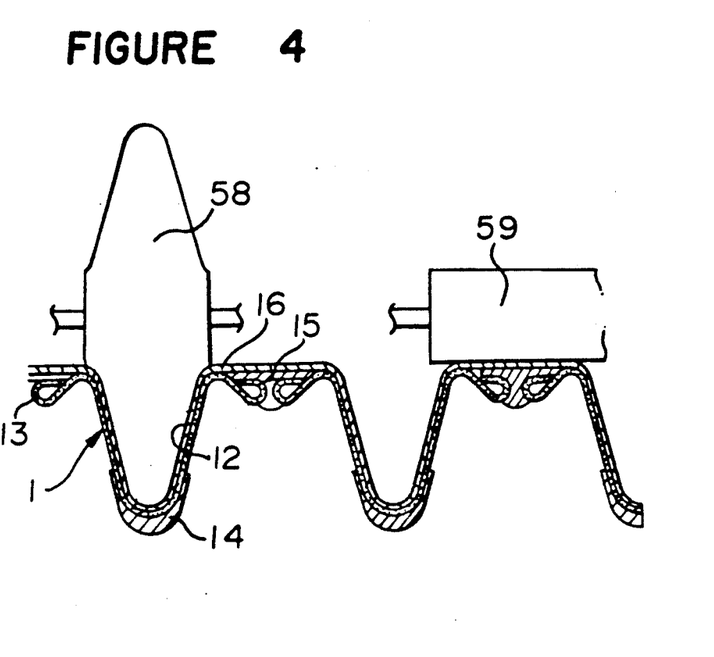
FIG. 4 is a diagram showing a step of coating the outer circumferential surface of a corrugated pipe with a synthetic resin layer.
Figure 5:
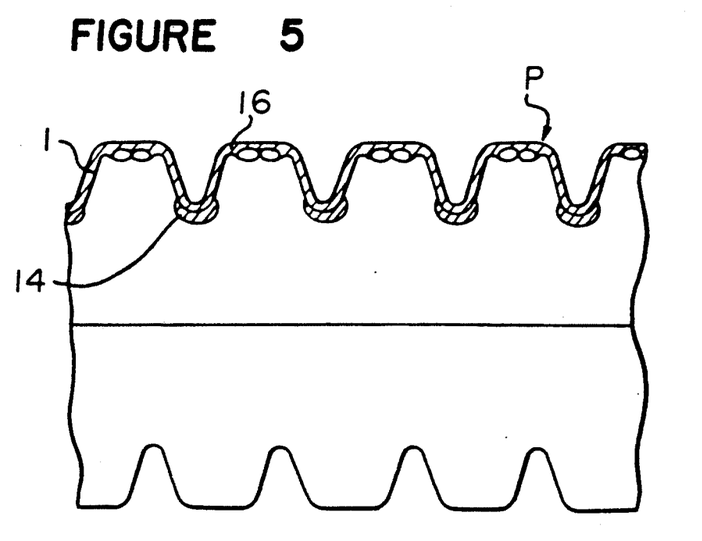
FIG. 5 is a front view partly broken and partly cross-sectioned of a corrugated pipe obtained by the method of the present invention.

Finally, hot air is blown to the outer circumferential surface of the pipe body by a hot air blower 43 to heat it at a temperature 70° C.-90° C. Then, the molten resin is extruded from the third extruder 8 to coat the outer circumferential surface with the molten resin. In this case, the molten resin is extruded in a flat sheet form from the extruder 8 having a flat nozzle, whereby a single recess portion 12 among the corrugated pipe body and ridge portions at both side of the recess portion 12 are simultaneously coated with the molten resin as shown in FIG. 4. Then, the molten resin is pressed by the third pressing roller 58 to stick the resin on the outer circumferential surface around the recess portion 12 and then, the molten resin covering the outer circumferential surface of the ridge portions is pressed by the fourth pressing roller 59, followed by blowing cool air to the outer circumferential surface of the pipe body by a cool air blower 8A to thereby cure the molten resin.

In FIG. 1, the fourth pressing rollers 59 are attached to the shafts 51 of the transferring means 5. However, the fourth pressing rollers 59 may be provided independent of the transferring means 5. Thus, a corrugated pipe P having the outer circumferential surface entirely coated with a synthetic resin layer 16 is formed and it is forwarded to the receiving section 9.

In the above-mentioned shaping step, the dimensions of the outer diameter of the spirally wound strip material are controlled as follows. Namely, a sensor 50 is disposed between the heating device 4 and the hot air blower 41 so as to detect the dimensions of the outer diameter of the pipe. The values as measured at predetermined time intervals are input in a control device (not shown) as an average value so that the average value and a predetermined value previously input in the control device are compared and the difference value is obtained. By controlling a rolling speed of the transferring means 5 so as to cancel the difference value between the average value and predetermined value, whereby a corrugated pipe P having a desired outer diameter can be formed.

The synthetic resin covering the inner and outer circumferential surfaces of the corrugated pipe may be a thermoplastic resin such as polyethylene resin or vinylchloride resin.

Figure 6:
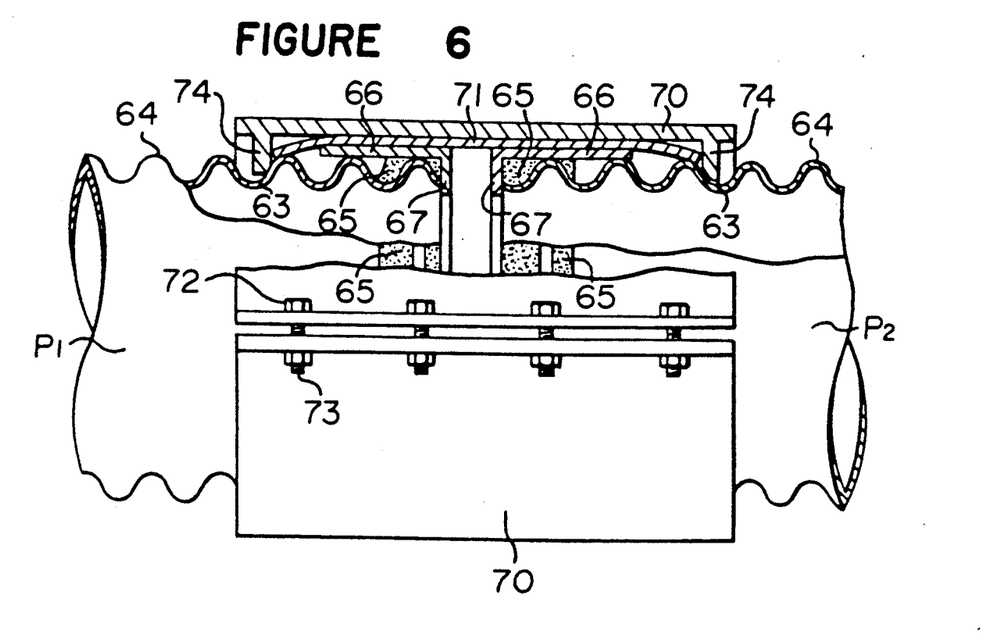
FIG. 6 is a front view partly cross-sectioned in the longitudinal direction showing an embodiment of connecting two corrugated pipes.

FIG. 6 shows an example of connecting corrugated pipes P1, P2 of the present invention. In FIG. 6, reference numerals P1, P2 designate corrugated pipes formed by the method of the present invention, numerals 66 designate short pipes with a flange 67 which are respectively attached to the edges of the corrugated pipes P1, P2. A packing 71 is placed so as to cover both outer circumferential surfaces of the short pipes 66. A tubular body 70 is attached onto the outer surface of the packing 71. The tubular body 70 comprises two semi-cylindrical bodies which are connectable by means of bolts 72 and nuts 73. Flanges 74 are respectively provided at both end of the tubular body 70 so as to inwardly project. The flanges 74 are fitted to the recess portion 63 of the corrugated pipes P1, P2 to thereby prevent the pipes P1, P2 from separating from each other. A numeral 65 designates a sealing material such as silicon resin, and a numeral 64 designate ridges of the corrugated pipes.

Figure 7:
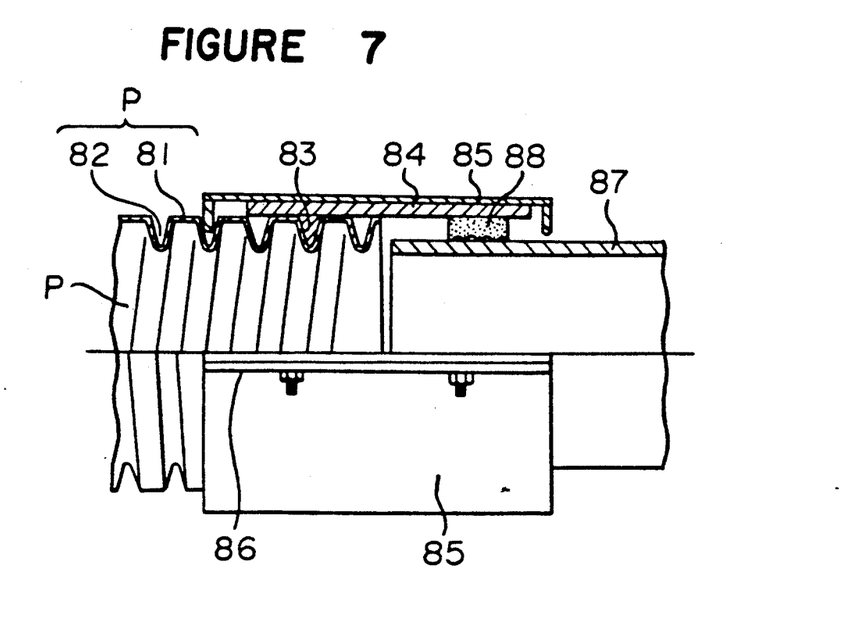
FIG. 7 is a front view partly cross-sectioned in the longitudinal direction showing an embodiment of connecting a corrugated pipe with a straight pipe.

FIG. 7 shows an example of connecting a corrugated pipe P to a straight pipe. In FIG. 7, a corrugated pipe P having ridge portions 81 and recess portions 82. A numeral 83 designates a sealing block of rubber or a plastic material which is fitted to a recess portion to thereby prevent water from entering inside the corrugated pipe P, a numeral 84 designates a cylindrical seal-packing, and a numeral 85 designates a cylindrical body comprising two semi-cylindrical bodies which are connectable with bolts and nuts. An annular rubber packing 88 is mounted on the outer circumferential surface of a straight pipe 87 to be jointed to the corrugated pipe P so that the outer diameter of the ridge portion 81 of the corrugated pipe P is the same as the outer diameter of the rubber packing 88.

Then, the cylindrical seal-packing 84 is placed bridging both end of the corrugated pipe P and the straight pipe 87. Thereafter, the two semi-cylindrical bodies 85 are fastened together so as to cover the cylindrical seal-packing 84.

Figure 8:
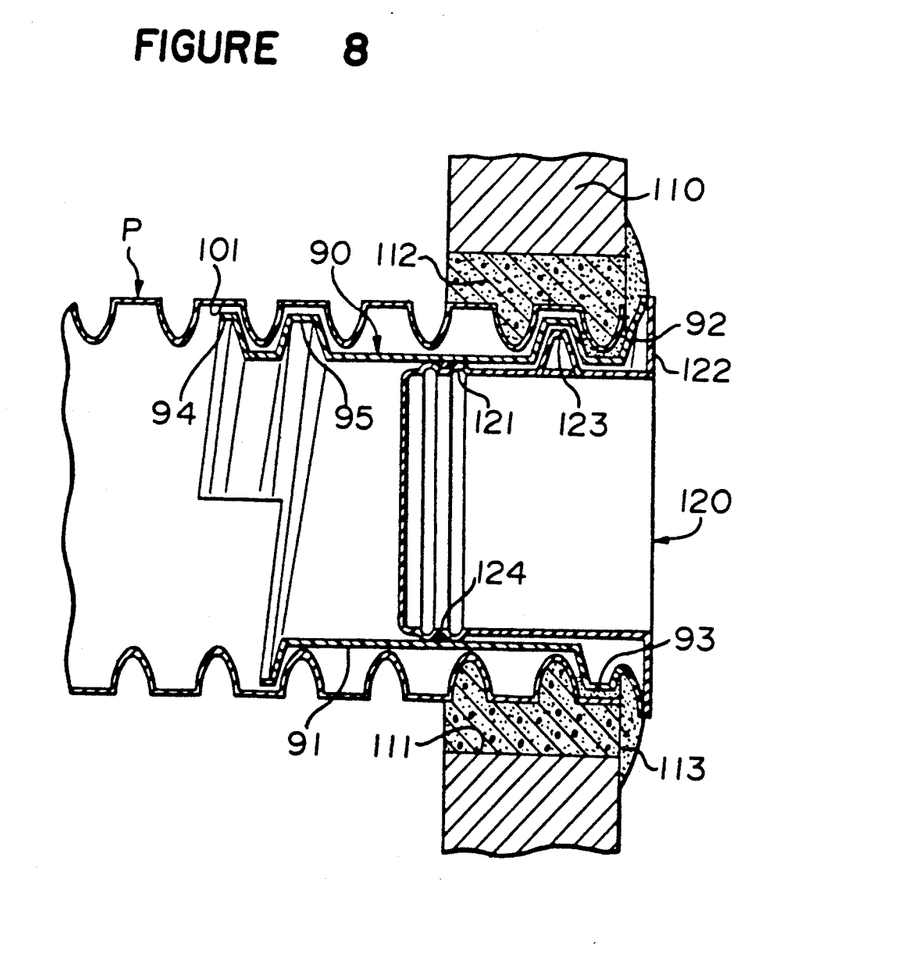
FIG. 8 is a longitudinal cross-sectional view showing an embodiment of connecting a bell mouth to an end of a corrugated pipe.

FIG. 8 shows an example of connecting a bell mouth 90 to the corrugated pipe P. In FIG. 8, a numeral 110 designates a manhole having an opening 111. A corrugated pipe P having a spiral ridge is connected at its one end to the manhole 110 by means of mortar 112. The bell mouth 90 is constituted by a linear tube portion 91 having a diameter slightly smaller than the inner diameter of the corrugated pipe P, an enlarged opening portion 92 in a form of funnel whose outer diameter is larger than the outer diameter of the corrugated pipe P, a single spiral projection 93 fitted to a spiral portion of the corrugated pipe P and another single spiral portion 95 fitted to a spiral portion of the pipe P. The bell mouth 90 can be engaged with the corrugated pipe by turning it so as to engage the spiral portions 93 and 95 in the corresponding spiral portions of the corrugated pipe P. A cap 120 to be attached to the opening of the bell mouth 90 is a bottomed cylindrical body having an outer diameter slightly smaller than the inner diameter of the bell mouth 90, annular projections 121 formed at the outer circumferential surface to hold an annular packing 124 to the inner wall of the bell mouth 90, a projection 123 formed at the outer circumferential surface so as to engage with the spiral projection 93 of the bell mouth 90 and a flange 122 formed at the opening to extend outwardly, which it is in contact with the enlarged opening portion 92 of the bell mouth. The cap 120 is firmly engaged with the bell mouth 90 by putting it in the bell mouth and turning it so as to engage the projection 123 with the spiral projection 93 of the bell mouth 90. However, the projection 123 may be omitted.

Thus, in accordance with the method of forming the corrugated pipe of the present invention, the flat strip-like metallic material is bent in a spiral form, and the adjoining edges of the spirally wound strip material are made in contact to each other, followed by covering the outer circumferential portion of the adjoining edges with molten resin. In this case, since the ring-like projections are formed at both edges of the strip material, further strong connection can be obtained by the synthetic resin layer. Accordingly, even when a tensile strength is applied to the corrugated pipe in its axial direction or a bending force is applied thereto, the breakage of the pipe at a joined portion can be prevented.

The ring-like projections at both edges of the strip material greatly increases durability to a force causing the pipe to flatten. Accordingly, when the corrugated pipe of the present invention is arranged in the underground, the pipe can not be crushed in flat.

In the corrugated pipe of the present invention, the outer circumferential surface of the pipe is coated with the synthetic resin layers after the strip-like metallic material has been formed in a spiral form. Accordingly, the outer circumferential surface is entirely covered by the corrosion-resistant synthetic resin layers. Therefore, the corrugated pipe has durability to underground water to cause corrosion.

The inner circumferential surface coated with the synthetic resin layer allows easy operations to insert cables such as power lines, communication lines and so on in the corrugated pipe because the friction between the pipe and the cable can be reduced and resistance to wear can be increased. Further, it is possible to avoid the damage of the inner circumferential surface of the pipe.

Thus, in accordance with the method and apparatus of the present invention, the corrugated pipe having excellent corrosion resistance property and flexibility and durable to a bending force and a stretching force can be obtained.

We claim:

1. A method of forming a corrugated pipe by winding in a spiral form a strip-like metallic material having both surfaces covered with a synthetic resin layer, characterized by comprising:

a step of passing the flat strip-like metallic material between plural pairs of upper and lower rollers to form a substantially U-shaped recess portion in cross section at a central portion in the longitudinal direction of the material and ring-like projections at both edges of the material, and by passing the material into a pair of control rollers, a first bending roller and second bending roller, successively, to thereby form a spirally wound strip material having a predetermined curvature in which the recess portion faces outside;

a step of forwarding and rolling the spirally wound strip material by means of a transferring means during which a molten resin is extruded from a first extruder to a back side of the recess portion of the strip material and at the same time a surface of the molten resin on the back side of the recess portion is pressed by a pressing roller to thereby form a synthetic resin layer having a predetermined thickness, and a step of making adjoining edges of the spirally wound strip material contact, coating an outer circumferential surface of the adjoining edges in mutual contact with a molten resin extruded from a second extruder, and pressing the surface of the molten resin by a pressing roller;

a step of coating the outer surface of the recess portion and the outer circumferential surface of the adjoining edges, on which the resin layer by the second extruder is formed, with a molten resin by a third extruder, and pressing the surface of the molten resin by a pressing roller.

2. An apparatus for manufacturing a corrugated pipe, comprising:

a bending machine for bending a flat strip-like metallic material having both surfaces covered with a synthetic resin layer in a spiral form to form a spirally wound strip material, wherein the bending machine has, arranged sequentially in a direction of transfer of the strip material, plural pairs of upper and lower rollers adapted to bend the strip material passing therethrough so that a substantially U-shaped recess portion in cross section is formed at a longitudinally central portion of the strip material and ring-like projections are formed at both edges of the strip material, a pair of upper and lower control rollers, and a first bending roller and a second bending roller in combination which support the strip material and bend the strip material into a spiral form in which the recess portion faces outside;

transferring means for transferring the strip material from the bending machine while rolling the strip material, with adjoining spirally wound edges of the strip material in contact with one another;

a first extruder positioned downstream of the bending machine and located so as to extrude and apply a molten resin to the back side of the recess portion of the spirally wound strip material;

a first pressing roller positioned downstream of the first extruder and located so as to press the surface of the molten resin extruded by the first extruder to stick it onto the back side of the recess portion;

a second extruder position downstream of the first pressing roller and located so as to extrude a molten resin on an outer circumferential surface of the adjoining edges of the spirally wound strip material;

a second pressing roller positioned downstream of the second extruder and located so as to press the surface of the molten resin extruded by the second extruder;

a third extruder positioned downstream of the second pressing roller and located so as to extrude a molten resin on the outer surface of the recess portion and the outer circumferential surface of the adjoining edges of the spirally wound strip material; and third and fourth pressing rollers positioned downstream of the third extruder and located so as to press the surface of molten resin extended from the third extruder onto the recess portion and the adjoining edges.

* * * * *